US012722526B2

(12) United States Patent
Kamba et al.

(10) Patent No.: US 12,722,526 B2
(45) Date of Patent: Sep. 1, 2026

(54) WORK MACHINE EQUIPPED WITH AN ELECTRICAL ENERGY STORAGE UNIT

(71) Applicant: MANITOU BF, Ancenis (FR)

(72) Inventors: Elie Kamba, Ancenis (FR); Stéphane Oger, Ancenis (FR)

(73) Assignee: MANITOU BF, Ancenis (FR)

( * ) Notice: Subject to any disclaimer, the term of this patent is extended or adjusted under 35 U.S.C. 154(b) by 188 days.

(21) Appl. No.: 18/848,451

(22) PCT Filed: Mar. 9, 2023

(86) PCT No.: PCT/EP2023/056061
§ 371 (c)(1),
(2) Date: May 27, 2025

(87) PCT Pub. No.: WO2023/180086
PCT Pub. Date: Sep. 28, 2023

(65) Prior Publication Data

US 2025/0282256 A1 Sep. 11, 2025

(30) Foreign Application Priority Data

Mar. 22, 2022 (FR) ...................................... 2202520

(51) Int. Cl.
*G07C 5/00* (2006.01)
*B60L 1/00* (2006.01)
(Continued)

(52) U.S. Cl.
CPC ............... *B60L 58/14* (2019.02); *B60L 1/003* (2013.01); *B60L 15/20* (2013.01); *B60Q 5/005* (2013.01);
(Continued)

(58) Field of Classification Search
CPC .......... B60L 58/14; B60L 1/003; B60L 15/20; B60L 2200/40; B60L 2240/54;
(Continued)

(56) References Cited

U.S. PATENT DOCUMENTS 7,356,305 B2 * 4/2008 Peeters ............... H04M 1/6091 455/12.1
8,060,400 B2 11/2011 Wellman
(Continued)

FOREIGN PATENT DOCUMENTS

JP 2016222401 A 12/2016

OTHER PUBLICATIONS

International Search Report and Written Opinion for International Patent Application No. PCT/EP2023/056061 mailed May 31, 2023, 16 pages.

*Primary Examiner* — Kito R Robinson
*Assistant Examiner* — Anthony Gabriel Mora
(74) *Attorney, Agent, or Firm* — Husch Blackwell LLP

(57) ABSTRACT

A work machine including a frame, a propulsion structure, a load-handling apparatus, an electrical energy storage unit, a device for evaluating state of charge configured to determine a value V representative of the state of charge of said electrical energy storage unit, and a control unit configured to:

compare the value V with a threshold V1;

activate a mode in which movement and handling operations are prohibited when the value V is lower than or equal to the threshold V1; and activate a rescue mode in which the operation of the propulsion structure is authorized when an authorization signal is sent by an authentication device and when the mode in which movement is prohibited is active.

20 Claims, 2 Drawing Sheets

(51) Int. Cl.

| | |
|---|---|
| ***B60L 15/20*** | (2006.01) |
| ***B60L 58/14*** | (2019.01) |
| ***B60Q 5/00*** | (2006.01) |
| ***B60Q 9/00*** | (2006.01) |
| ***B66F 17/00*** | (2006.01) |
| ***G07C 5/02*** | (2006.01) |
| ***G07C 5/04*** | (2006.01) |
| ***G07C 5/08*** | (2006.01) |

(52) U.S. Cl.
CPC .............. *B60Q 9/00* (2013.01); *B66F 17/006* (2013.01); *B60L 2200/40* (2013.01); *B60L 2240/54* (2013.01); *B60L 2250/10* (2013.01); *B60L 2260/40* (2013.01)

(58) Field of Classification Search
CPC . B60L 2250/10; B60L 2260/40; B60Q 5/005; B60Q 9/00; B66F 17/006
See application file for complete search history.

(56) References Cited

U.S. PATENT DOCUMENTS

| | | | | |
|---|---|---|---|---|
| 2015/0039163 | A1* | 2/2015 | West ..................... | E02F 9/2091<br>180/65.265 |
| 2021/0001810 | A1* | 1/2021 | Rivard ................. | G06V 40/172 |
| 2021/0276423 | A1 | 9/2021 | Lombardo et al. | |

* cited by examiner

WORK MACHINE EQUIPPED WITH AN ELECTRICAL ENERGY STORAGE UNIT

TECHNICAL FIELD

The disclosure relates to the field of work machines and relates more particularly to electric work machines, that is to say those which are equipped with an electrical energy storage unit for supplying energy to the work machine.

The disclosure relates more particularly to electric work machines comprising a propulsion structure for making movement of the work machine possible and a load-handling apparatus, and in which the electrical energy storage unit is configured to supply energy to the propulsion structure and to the load-handling apparatus.

BACKGROUND

In the prior art, it is known practice to equip electric work machines with devices aiming to avoid their battery reaching states of deep discharge, since such states of discharge are liable to significantly degrade their lifetime.

The document JP2016222401 relates to a crane equipped with a propulsion structure and with a load-handling apparatus which are supplied with electrical energy by a battery. It discloses a method for controlling such a crane in which the state of charge of the battery is determined, it is compared with threshold values and certain operations of the crane are authorized or prohibited in accordance with the result of the aforementioned comparison. Thus, if the battery has a satisfactory state of charge and if its voltage is equal to or higher than a first voltage threshold value, the crane may be moved and used without any restriction on the movement capabilities or the cranage operations. If the battery has a lower state of charge and if, as a consequence, its voltage is lower than the aforementioned first voltage threshold value, while at the same time being higher than a second voltage threshold value, which is lower than the first voltage threshold value, the cranage operations are restricted merely to the operations which are necessary for depositing the load, returning the crane device or the stabilization device to their folded position and moving the crane. Finally, if the battery has an even lower state of charge and if its voltage is lower than the aforementioned second threshold value, the operation of the crane halts and it is no longer possible to move it or to move its load-handling apparatus.

Such a control method is not entirely satisfactory. In particular, there remains a significant risk that the battery reaches the state of charge corresponding to the second threshold value, thus causing the crane to halt while it is located in a place which is difficult to access, for example on a construction site.

SUMMARY

One idea which forms the basis of the disclosure is to propose a work machine equipped with an electrical energy storage unit for supplying energy to the work machine and which makes it possible to avoid the energy storage unit reaching levels of deep discharge which are liable to degrade its lifetime while at the same time limiting even further the risks that the work machine is completely immobilized in a situation in which accessing the work machine would be challenging.

According to one embodiment, the disclosure supplies a work machine comprising:

- a frame;
- a propulsion structure in contact with the ground for making movement of the work machine possible;
- a load-handling apparatus mounted such as to be able to move with respect to the frame;
- an electrical energy storage unit which is arranged to supply electrical energy to the propulsion structure and to the load-handling apparatus;
- a device for evaluating state of charge which is configured to determine a value V which is representative of the state of charge of said electrical energy storage unit;
- an authentication device configured to send an authorization signal in response to an authentication action; and
- a control unit which is configured to:
  - compare the value V with a threshold V1;
  - activate a mode in which movement and handling operations are prohibited, in which the operation of the propulsion structure and the operation of the load-handling apparatus are prevented when the value V is lower than or equal to the threshold V1; and
  - activate a rescue mode in which the operation of the propulsion structure is authorized in order to make movement of the work machine possible in response to the sending of the authorization signal by the authentication device while the mode in which movement and handling operations are prohibited is active.

Thus, on the one hand, the electrical energy storage unit is protected against states of deep discharge by preventively preventing the operation of the propulsion structure and of the load-handling apparatus when the state of charge of the electrical energy storage unit has reached the threshold $V_1$. On the other hand, the aforementioned features make it possible for a privileged operator to authenticate in order to access the rescue mode making it possible for them to move the work machine toward a device for recharging the electrical energy storage unit or toward a transport vehicle which is able to transport the work machine, while the state of charge of the electrical energy storage unit is lower than or equal to $V_1$. This notably makes it possible to avoid totally immobilizing the work machine in situations where recovering it would be exceedingly difficult (for example, on a construction site).

According to some embodiments, such a work machine may comprise one or more of the following features.

According to one embodiment, the control unit is configured to:

- compare the value V with a threshold $V_2$ which is higher than $V_1$;
- activate a movement-only mode in which the operation of the propulsion structure is authorized and the operation of the load-handling apparatus is prevented when the value V is lower than or equal to the threshold $V_2$ and is higher than the threshold $V_1$.

Thus, such a mode makes it possible to stop the operation of the load-handling apparatus preventively before the mode is activated in which movement and handling operations are prohibited, in which the operation of the propulsion structure is also prohibited, which encourages the operator to move the work machine in order to recharge the electrical energy storage unit before its state of charge reaches the threshold $V_1$.

According to one embodiment, the control unit is configured to:

- compare the value V with a threshold $V_3$ which is higher than $V_2$;

activate a mode in which handling operations are limited, in which the operation of the propulsion structure is authorized and the operation of the load-handling apparatus is restricted when the value V is lower than or equal to the threshold $V_3$ and higher than the threshold $V_2$; and activate a normal mode in which the operation of the propulsion structure and the operation of the load-handling apparatus are authorized when the value V is higher than the threshold $V_3$.

Thus, such a mode in which handling operations are limited makes it possible to encourage or to force the user of the work machine to halt handling operations in order to conserve enough energy capacity to be able to move the work machine toward a recharging device or toward a transport vehicle.

According to one embodiment, the control unit is configured to:

compare the value V with a threshold $V_3$ which is higher than $V_1$;

activate a mode in which handling operations are limited, in which the operation of the propulsion structure is authorized and the operation of the load-handling apparatus is restricted when the value V is lower than or equal to the threshold $V_3$; and activate a normal mode in which the operation of the propulsion structure and the operation of the load-handling apparatus are authorized when the value V is higher than the threshold $V_3$.

According to one embodiment, the control unit is configured so that, in the mode in which handling operations are limited, the restriction on the operation of the load-handling apparatus is chosen from among a limitation to the operations of moving the load-handling apparatus in the direction of a folded position, a limitation on the maximum movement speed of the load-handling apparatus with respect to a maximum movement speed of the load-handling apparatus in the normal mode, a limitation on the maximum power available for the movement of the load-handling apparatus with respect to a maximum power available for the movement of the load-handling apparatus in the normal mode and any combination thereof.

According to one embodiment, the control unit is configured to:

compare the value V with a threshold $V_4$ which is higher than $V_1$; and generate an alert signal when the value is lower than or equal to $V_4$.

According to one embodiment, the work machine further comprises a visual indicator of the state of charge of the energy storage unit, the visual indicator being configured to deliver information which is representative of a completely discharged state of the electrical energy storage unit when the value V is lower than or equal to $V_1$.

According to one embodiment, the threshold $V_1$ corresponds to a state of charge of the electrical energy storage unit which is comprised between 20 and 34%, preferably between 25 and 29%, for example of the order of 27%. Thus, the mode in which movement and handling operations are prohibited is activated before the electrical energy storage unit has reached levels of deep discharge which are situated below 20%. Furthermore, the electrical energy storage unit conserves, in rescue mode, a capacity which makes it possible for the work machine to be moved by the privileged operator with a view to being recharged, before such levels of deep discharge are reached.

According to one embodiment, the authentication device comprises a memory unit storing a password, and an input unit for inputting a character string, the authentication device being configured to send the authorization signal when the character string corresponds to the stored password.

According to one embodiment, the propulsion structure comprises an electric propulsion motor which is coupled to at least one axle of the work machine and which is supplied with energy by the electrical energy storage unit.

According to one embodiment, the load-handling apparatus comprises a device for driving the load-handling apparatus which is electric or electrohydraulic.

According to one embodiment, the disclosure also provides a method for controlling a work machine comprising a frame; a propulsion structure in contact with the ground for making movement of the work machine possible; a load-handling apparatus mounted so as to be able to move with respect to the frame, and an electrical energy storage unit which is arranged to supply electrical energy to the propulsion structure and to the load-handling apparatus; the control method comprising the following steps:

determining a value V which is representative of the state of charge of said electrical energy storage unit;

comparing the value V with a threshold V1;

activating a mode in which movement and handling operations are prohibited, in which the operation of the propulsion structure and the operation of the load-handling apparatus are prevented when the value V is lower than or equal to the threshold V1; and activating a rescue mode in which the operation of the propulsion structure is authorized in order to make movement of the work machine possible in response to the sending of an authorization signal by an authentication device in response to an authentication action while the mode in which movement and handling operations are prohibited was active.

According to some embodiments, a method may comprise one or more of the following features.

According to one embodiment, the method further comprises the following steps:

comparing the value V with a threshold $V_2$ which is higher than $V_1$;

activating a movement-only mode in which the operation of the propulsion structure is authorized and the operation of the load-handling apparatus is prevented when the value V is lower than or equal to the threshold $V_2$ and is higher than the threshold $V_1$.

According to one embodiment, the method further comprises the following steps:

comparing the value V with a threshold $V_3$ which is higher than $V_2$;

activating a mode in which handling operations are limited, in which the operation of the propulsion structure is authorized and the operation of the load-handling apparatus is restricted when the value V is lower than or equal to the threshold $V_3$ and higher than the threshold $V_2$; and activating a normal mode in which the operation of the propulsion structure and the operation of the load-handling apparatus are authorized when the value V is higher than the threshold $V_3$.

According to one embodiment, the method further comprises the following steps:

comparing the value V with a threshold $V_3$ which is higher than $V_1$;

activating a mode in which handling operations are limited, in which the operation of the propulsion structure is authorized and the operation of the load-handling apparatus is restricted when the value V is lower than or equal to the threshold $V_3$; and activating a normal mode in which the operation of the propulsion structure and the operation of the load-handling apparatus are authorized when the value V is higher than the threshold $V_3$.

BRIEF DESCRIPTION OF THE DRAWINGS

The disclosure will be better understood, and other aims, details, features and advantages thereof will become more clearly apparent over the course of the following description of several particular embodiments of the disclosure, which are given solely by way of nonlimiting illustration, with reference to the attached drawings.

DESCRIPTION

Figure 1:
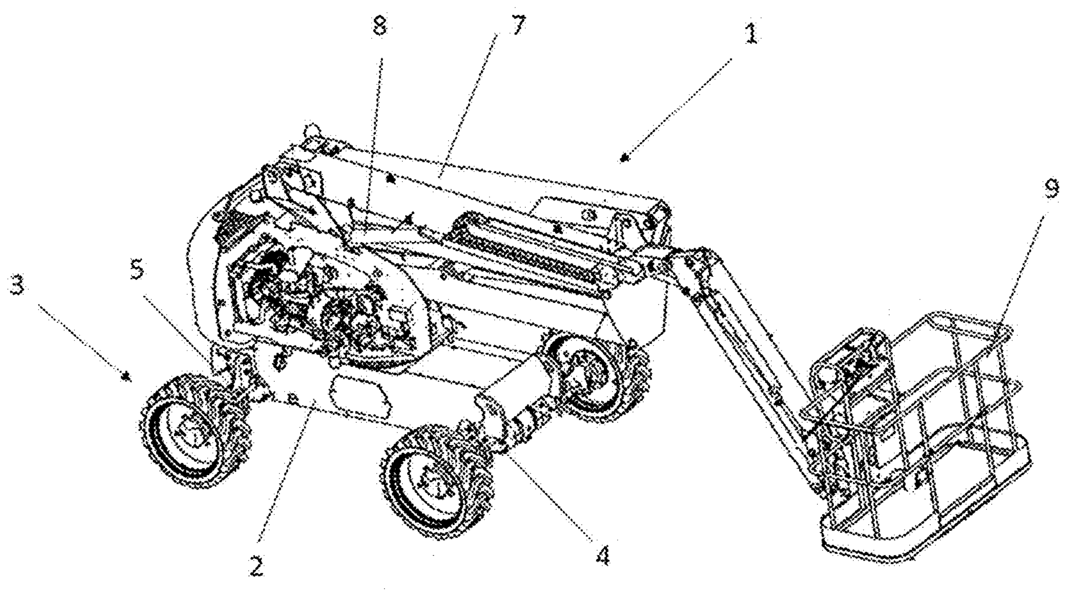
FIG. 1 is a perspective view of a work machine of the aerial work platform type.

With reference to FIG. 1, a work machine 1 is depicted which, in the embodiment depicted, is an aerial work platform. Of course, the disclosure applies to other types of work machines, such as telescopic handlers, reach trucks, excavators, loaders, cranes or others.

The work machine 1 comprises a frame 2 as well as a propulsion structure 3 in contact with the ground for making movement of the work machine 1 on the ground possible.

In the embodiment depicted, the propulsion structure 3 has two axles 4, 5, a front axle and a rear axle, which are each mounted on the frame 2 along a transverse axis and are each equipped with two wheels, one on the left and the other on the right. At least one of the two axles 4, 5 and, preferably, both are driven and are, for this purpose, coupled to an electric motor, which is not depicted in FIG. 1, via a transmission device. In an alternative embodiment, the propulsion structure 3 comprises tracks.

In addition, the work machine 1 comprises a load-handling apparatus 6. In FIG. 1, the load-handling apparatus 6 comprises a lifting arm 7 mounted so as to pivot on the frame 2 of the work machine 1 about at least one horizontal axis. In the embodiment illustrated, the lifting arm 7 comprises several parts which are mounted hinged with one another. In other embodiments, the lifting arm 7 is telescopic and comprises at least two parts which slide in one another.

The load-handling apparatus 6 comprises at least one cylinder 8 which makes it possible to make the lifting arm 7 pivot with respect to the frame 2. For this purpose, the cylinder 8 comprises a first end mounted hinged on the frame 2 of the work machine 1 and a second end mounted hinged on the lifting arm 7. The lifting arm 7 is thus able to deploy from its folded, stowed position depicted in FIG. 1.

Moreover, the lifting arm 7 comprises a distal end which is equipped with an accessory 9 or a modular accessory carrier which is capable of receiving accessories of several types. In the embodiment depicted, the accessory 9 is a basket. However, in other embodiments, the accessory 9 is a work tool, such as a pair of forks, a bucket, a winch, a gripper or others.

Figure 2:
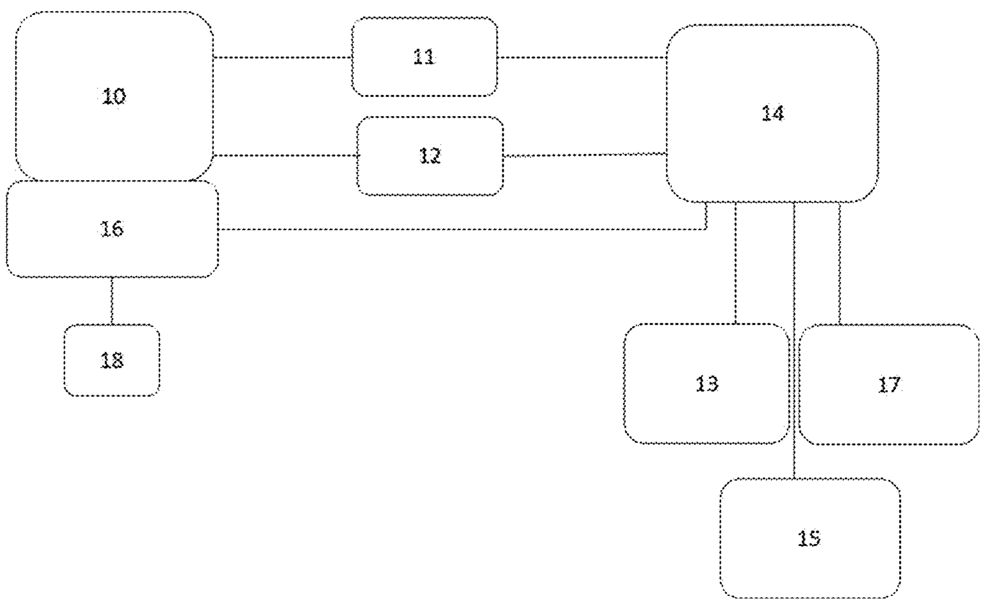
FIG. 2 is a schematic illustration of the electrical equipment of a work machine of the type depicted in FIG. 1.

In relation to FIG. 2, the electrical equipment of the work machine 1 is described below.

The work machine 1 comprises an electrical energy storage unit 10. The electrical energy storage unit 10 comprises, for example, one or more batteries, for example of the lead-acid type or of the lithium-ion type. The electrical energy storage unit 10 is electrically connected to at least one electric motor 11 in order to supply it with energy.

In the embodiment depicted, the electrical energy storage unit 10 supplies power to an electric motor 11 as well as a device 12 for driving the load-handling apparatus 6. The electric motor 11, referred to below as the propulsion motor 11, belongs to the propulsion structure 3 and is intended to propel the work machine 1. For this purpose, the propulsion motor 11 is coupled, by a transmission device which is not depicted, to one of the two axles 4, 5 or to both. The transmission device may be a mechanical device or a hydraulic device.

The device 12 for driving the load-handling apparatus 6 may be electric and include electrical actuators. The driving device 12 may also be electrohydraulic and include a pump driven by an electric motor, one or more hydraulic actuators, such as the cylinder 8 which makes it possible to move the lifting arm 7, hydraulic distributors, etc.

The work machine 1 comprises at least one member 13 for controlling the propulsion structure 3, such as an accelerator pedal, which is configured to deliver requests to actuate the propulsion motor 11 to a control unit 14. The work machine 1 also comprises at least one member 15 for controlling the load-handling apparatus 6, for example of the joystick type, which is configured to deliver requests to actuate the load-handling apparatus 6 to the control unit 14.

Moreover, the work machine 1 comprises a device 16 for evaluating state of charge which is associated with the electrical energy storage unit 10 and which is configured to determine a value V which is representative of the state of charge of the electrical energy storage unit 10 and transmit it to the control unit 14. State of charge is a relative measure of the quantity of energy stored corresponding to the ratio between the charge of the electrical energy storage unit 10 at a certain moment and its total capacity, at the outset.

According to one embodiment, the device 16 for evaluating state of charge comprises a voltage sensor which delivers a measurement of the voltage, in an open circuit, across the terminals of the electrical energy storage unit 10. Since the voltage across the terminals of the electrical energy storage unit 10 varies in accordance with its level of charge, such a measurement of the voltage across the terminals of the electrical energy storage unit 10 makes it possible to estimate its state of charge.

According to one embodiment, the device 16 for evaluating state of charge comprises a coulomb counter which measures the current during the charging or the discharging of the energy storage unit and integrates it, which makes it possible to determine the amount of charge injected into or drawn from the electrical energy storage unit 10 and thus to quantify its state of charge.

Moreover, the work machine 1 is equipped with an authentication device 17. The authentication device may be arranged in any place which is appropriate for being used by an operator, for example in a driver's cab of the machine if there is one or on a control console arranged in the basket 9 or indeed on one side of the frame 2.

The authentication device 17 is configured to deliver an authorization signal S1 in response to an authentication action. According to one embodiment, the authentication device 17 uses password authentication. For this purpose, the authentication device 17 comprises a memory unit which stores a password as well as an input unit for inputting a character string. In this case, the authentication device 17 compares the character string input via the input unit with the password stored in the memory unit and delivers the authorization signal S1 when the character string corresponds to the stored password. According to other embodiments, the authentication device 17 uses other authentication methods. The authentication device 17 may notably comprise a reader intended to recognize material proof, such as a key or a card. The authentication device 17 may also comprise a biometric reader intended to recognize one or more biometric identifiers. According to one embodiment, the authentication device 17 uses multifactor authentication using the combination of at least two of the aforementioned methods.

The authentication device 17 notably makes it possible to deliver an authorization signal S1 which makes it possible for a privileged operator to access a rescue mode, the activation of which will be described in detail below.

According to one variant embodiment, the authentication device 17 further serves as an antitheft access control system. For this purpose, the authentication device 17 is also configured to deliver, in reaction to an authentication action, a start signal which is necessary for starting the work machine 1 and/or an opening signal which is necessary for accessing the cab of the work machine 1. In this case, when the authentication device 17 uses password authentication, the memory unit stores a second password and the authentication device 17 delivers the start signal and/or the opening signal when the character string inputted via the input unit corresponds to this second password.

In a manner known per se, the control unit 14 is configured to control, notably, the propulsion motor 11 and the device 12 for driving the load-handling apparatus 6 in accordance with the requests to actuate the propulsion motor 11 and the load-handling apparatus 6 which are delivered by the control member 13 and the control member 15, respectively.

Moreover, the control unit 14 compares the value V which is representative of the state of charge of the electrical energy storage unit 10 and compares it with thresholds in order to authorize or prohibit certain operations of the work machine and/or alert the operator of the discharging of the electrical energy storage unit 10 beyond a threshold.

According to one embodiment, the control unit 14 compares the value V with five thresholds $V_1$, $V_2$, $V_3$, $V_4$, $V_5$, which are mentioned here in ascending order so that the following inequalities, $V_1<V_2<V_3<V_4<V_5$, are satisfied.

Figure 3:
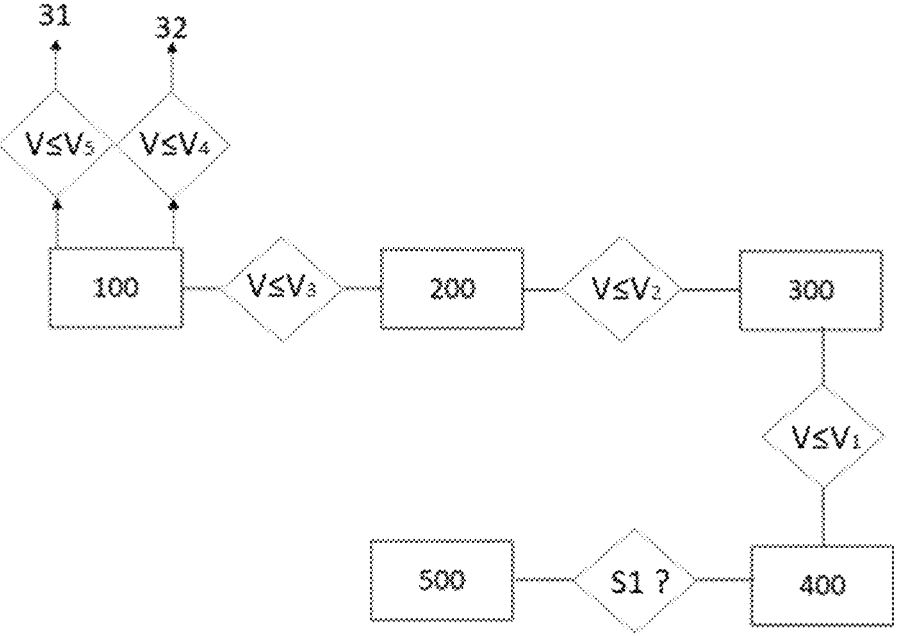
FIG. 3 is a diagram illustrating the various operating modes of the work machine when the electrical energy storage unit is discharging.

FIG. 3 illustrates a state machine implemented by the control unit 14 and comprising the various operating modes of the work machine during a discharge cycle of the electrical energy storage unit.

As long as the value V is higher than $V_3$, the control unit 14 activates a normal operating mode 100 in which the operation of the propulsion motor 11 and handling motor 12 is authorized. No restriction linked to the state of charge of the electrical energy storage unit 10 is, consequently, applied to the operation of the propulsion structure 3 and of the load-handling apparatus 6.

When the value V becomes lower than or equal to the threshold $V_5$, the control unit 14 generates a first visual and/or audible alert signal 31. The alert signal is, for example, a message which is displayed on the dashboard of the work machine 1. The threshold $V_5$ corresponds to a state of charge of the electrical energy storage unit 10 which is comprised between 42 and 56%, advantageously comprised between 47 and 51% and, for example, of the order of 49%.

When the value V becomes lower than or equal to the threshold $V_4$, the control unit 14 generates a second visual and/or audible alert signal 32, which is, for example, displayed on the dashboard of the work machine 1. The threshold $V_4$ corresponds to a state of charge of the electrical energy storage unit 10 which is comprised between 35 and 49%, advantageously comprised between 40 and 44% and, for example, of the order of 42%.

When the value V is lower than or equal to the threshold $V_3$ while at the same time staying strictly higher than the threshold $V_2$, the control unit 14 activates a mode 200 in which handling operations are limited. In this mode, the propulsion structure 3 is authorized to operate as in the normal operating mode but restrictions are applied to the operation of the load-handling apparatus 6. The restrictions on the operation of the load-handling apparatus 6 consist, for example, in limiting its movement to the direction of its folded position. Alternatively or additionally, the restrictions consist in limiting the maximum movement speed of the load-handling apparatus 6 with respect to its maximum speed in the normal mode 100 and/or in limiting the power available for the movement of the load-handling apparatus 6 with respect to its power available in the normal mode. By way of example, the maximum movement speed of the load-handling apparatus 6 and/or the maximum power available for its movement is reduced according to a proportional law taking account of the actual state of charge of the electrical energy storage unit.

The threshold $V_3$ corresponds to a state of charge of the electrical energy storage unit 10 which is, preferably, comprised between 27 and 41%, advantageously comprised between 32 and 36% and, for example, of the order of 34%.

When the value V is lower than or equal to the threshold $V_2$ while at the same time staying strictly higher than the threshold $V_1$, the control unit 14 activates a movement-only mode 300. In this mode, the operations of the propulsion structure 3 are authorized while the operation of the load-handling apparatus 6 is prevented. The threshold $V_2$ corresponds to a state of charge of the electrical energy storage unit 10 which is, preferably, comprised between 24 and 38%, advantageously comprised between 29 and 33% and, for example, of the order of 31%.

Finally, when the value V is lower than or equal to the threshold $V_1$, the control unit 14 activates a mode 400 in which movement and handling operations are prohibited. In this mode, the operation of the propulsion structure 3, like that of the load-handling apparatus 6, is prohibited.

However, the control unit 14 switches from the mode 400 in which movement and handling operations are prohibited to a rescue mode 500 in response to the sending of an authorization signal S1 by the authentication device 17 while the mode 400 in which movement and handling operations are prohibited is active. In the rescue mode 500, the operation of the propulsion motor 11 is authorized although the value V which is representative of the level of charge of the electrical energy storage unit is lower than $V_1$. This makes it possible for a privileged operator who has previously identified themselves to move the work machine 1 toward a device for recharging the electrical energy storage unit or toward a transport vehicle which is able to transport the work machine, which makes it possible to avoid totally immobilizing the work machine in situations where recovering it would be exceedingly difficult while the electrical energy storage unit 10 is not totally discharged.

Advantageously, the threshold $V_1$ corresponds to a state of charge comprised between 20 and 34%, preferably comprised between 25 and 29%, for example of the order of 27%. Choosing such a threshold $V_1$ makes it possible, on the one hand, to prevent any operator from degrading the lifetime of the electrical energy storage unit 10 by discharging it as far as deep levels of discharge, which are situated beyond 20%, and, on the other hand, to conserve a sufficient level of charge for a privileged user to be able, after having authenticated, to have enough energy available to move the work machine 1 as far as a recharging device or a transport vehicle, preferably without reaching deep levels of discharge.

Note that the thresholds $V_2$, $V_3$, $V_4$, $V_5$ are optional and that, in other embodiments, the control unit 14 uses only some of the aforementioned thresholds and associated operating modes and/or actions. Thus, according to one variant embodiment, the work machine comprises only one of the two modes from among the mode 200 in which handling operations are limited and the movement-only mode 300.

Moreover, the device 16 for evaluating state of charge is, advantageously, associated with a visual indicator 18 of charge which is, for example, positioned on the dashboard of the work machine and which may notably be arranged in the driver's cab of the machine if there is one or on a control console arranged in the basket 9. The visual indicator 18 of charge depicts, in graphical form, information which is representative of the charge of the electrical energy storage unit 10. Advantageously, the visual indicator 18 of charge is configured so that information which is representative of a totally discharged state of the electrical energy storage unit 10 corresponds to the level of the threshold $V_1$.

Some of the elements depicted, notably the control unit 14 and the device 16 for evaluating state of charge and the authentication device 17, may be embodied in various forms, in a unitary or distributed manner, by means of hardware and/or software components. Application-specific integrated circuits (ASICs), field-programmable gate arrays (FPGAs) and microprocessors are some usable hardware components. Software components may be written in various programming languages, for example C, C++, Java or VHDL. This list is not exhaustive.

Although the disclosure has been described in connection with several particular embodiments, it is quite obvious that it is in no way limited thereto and that it comprises all the technical equivalents of the means described as well as the combinations thereof if these fall within the scope of the disclosure.

The use of the verb "comprise" or "include" and of its conjugated forms does not exclude the presence of elements or steps other than those listed in a claim.

In the claims, any reference sign between parentheses should not be interpreted as a limitation on the claim.

The invention claimed is:

1. A work machine comprising:
- a frame;
- a propulsion structure in contact with a ground surface for moving the work machine;
- a load-handling apparatus mounted to the frame;
- an electrical energy storage unit which is arranged to supply electrical energy to the propulsion structure and to the load-handling apparatus;
- a device configured to determine a value V which is representative of a state of charge of the electrical energy storage unit;
- an authentication device configured to send an authorization signal in response to an authentication action; and
- a control unit which is configured to:
  - compare the value V to a first threshold V1;
  - activate a stop mode in which operation of the propulsion structure and operation of the load-handling apparatus are prevented when the value V is lower than or equal to the first threshold V1; and
  - activate a rescue mode in which operation of the propulsion structure is authorized in order to move the work machine in response to the authorization signal while the stop mode is active.

2. The work machine of claim 1, wherein the control unit is configured to:
- compare the value V with a second threshold V2 which is higher than the first threshold V1;
- activate a movement-only mode in which operation of the propulsion structure is authorized and operation of the load-handling apparatus is prevented when the value V is lower than or equal to the second threshold V2 and is higher than the first threshold V1.

3. The work machine of claim 2, wherein the control unit is configured to:
- compare the value V with a third threshold V3 which is higher than the second threshold V2;
- activate a limited mode in which operation of the propulsion structure is authorized and operation of the load-handling apparatus is restricted when the value V is lower than or equal to the third threshold V3 and higher than the second threshold V2; and
- activate a normal mode in which operation of the propulsion structure and operation of the load-handling apparatus are authorized when the value V is higher than the third threshold V3.

4. The work machine of claim 2, wherein the control unit is configured to:
- compare the value V with a third threshold V3 which is higher than the first threshold V1;
- activate a limited mode in which operation of the propulsion structure is authorized and operation of the load-handling apparatus is restricted when the value V is lower than or equal to the third threshold V3; and
- activate a normal mode in which operation of the propulsion structure and operation of the load-handling apparatus are authorized when the value V is higher than the third threshold V3.

5. The work machine of claim 4, wherein the control unit is configured so that, in the limited mode, the restriction on operation of the load-handling apparatus is one or more of limiting movement of the load-handling apparatus to movement in a direction of a folded position, limiting a maximum movement speed of the load-handling apparatus, and limiting a maximum power available for movement of the load-handling apparatus.

6. The work machine of claim 1, wherein the control unit is configured to:
- compare the value V to a second threshold V2, which is higher than V1; and
- generate an alert signal when the value is lower than or equal to the second threshold V2.

7. The work machine of claim 1, further comprising a visual indicator of the state of charge of the electrical energy storage unit, the visual indicator being configured to deliver information that is representative of a completely discharged state of the electrical energy storage unit when the value V is lower than or equal to the first threshold V1.

8. The work machine of claim 1, wherein the first threshold V1 corresponds to the state of charge of the electrical energy storage being between 20% and 34%.

9. The work machine of claim 1, wherein the authentication device comprises a memory unit storing a password, and an input unit for inputting a character string, the authentication device device being configured to send the authorization signal when the character string corresponds to the stored password.

10. The work machine of claim 1, wherein the propulsion structure comprises an electric propulsion motor that is coupled to at least one axle of the work machine and that is supplied with energy by the electrical energy storage unit, and wherein the load-handling apparatus comprises an electric handling motor that is coupled to a hydraulic pump of a hydraulic circuit configured to move a lifting arm and that is supplied with energy by the electrical energy storage unit.

11. A method for controlling a work machine comprising a frame, a propulsion structure in contact with the ground for moving the work machine, a load-handling apparatus mounted to move with respect to the frame, and an electrical energy storage unit that is arranged to supply electrical energy to the propulsion structure and to the load-handling apparatus, the control method comprising:

determining a value V that represents a state of charge of the electrical energy storage unit;

comparing the value V with a first threshold V1;

activating a stop mode in which operation of the propulsion structure and operation of the load-handling apparatus are prevented when the value V is lower than or equal to the first threshold V1; and activating a rescue mode in which operation of the propulsion structure is authorized in response to an authorization signal from an authentication device, the authorization signal being sent in response to an authentication action while the stop mode is active.

12. The method for controlling a work machine of claim 11, further comprising:

comparing the value V to a second threshold V2 that is higher than the first threshold V1;

activating a movement-only mode in which operation of the propulsion structure is authorized and operation of the load-handling apparatus is prevented when the value V is lower than or equal to the second threshold V2 and is higher than the first threshold V1.

13. The method for controlling a work machine of claim 12, further comprising:

comparing the value V with a third threshold V3 that is higher than the second threshold V2;

activating a limited mode in which operation of the propulsion structure is authorized and operation of the load-handling apparatus is restricted when the value V is lower than or equal to the third threshold V3 and higher than the second threshold V2; and activating a normal mode in which operation of the propulsion structure and operation of the load-handling apparatus are authorized when the value V is higher than the third threshold V3.

14. The method for controlling a work machine of claim 11, further comprising:

comparing the value V to a third threshold V3 which is higher than the first threshold V1;

activating a limited mode in which operation of the propulsion structure is authorized and the operation of the load-handling apparatus is restricted when the value V is lower than or equal to the third threshold V3; and activating a normal mode in which operation of the propulsion structure and operation of the load-handling apparatus are authorized when the value V is higher than the third threshold V3.

15. A work machine comprising:

an electrical energy storage unit configured to supply electrical energy to a propulsion structure and to a load-handling apparatus, the load-handling apparatus being moveably mounted to a frame;

an evaluation device configured to determine a state of charge of the electrical energy storage unit;

an authentication device configured to send an authorization signal in response to an authentication action; and a control unit configured to:

compare the state of charge with a first threshold value;

activate a stop mode when the state of charge is lower than or equal to the first threshold value, the stop mode being configured to prohibit operation of the propulsion structure and of the load-handling apparatus; and activate a rescue mode that permits operation of the propulsion structure in response receiving the authorization signal while the stop mode is active.

16. The work machine of claim 15, wherein the control unit is configured to:

compare the state of charge with a second threshold value that is higher than the first threshold value;

activate a movement-only mode when the state of charge is lower than or equal to the second threshold value and is higher than the first threshold value, the movement-only mode being configured to permit operation of the propulsion structure and prohibit operation of the load-handling apparatus.

17. The work machine of claim 16, wherein the control unit is configured to:

compare the state of charge with a third threshold value that is higher than the second threshold value;

activate a limited mode when the state of charge is lower than or equal to the third threshold value and higher than the second threshold value, the limited mode being configured to permit operation of the propulsion structure and restrict operation of the load-handling apparatus; and activate a normal mode when the state of charge is higher than the third threshold value, the normal mode being configured to permit operation of the propulsion structure and of the load-handling apparatus.

18. The work machine of claim 16, wherein the control unit is configured to:

compare the state of charge to a third threshold value that is higher than the first threshold value;

activate a limited mode when the state of charge is lower than or equal to the third threshold value, wherein the limited mode is configured to permit operation of the propulsion structure and restrict operation of the load-handling apparatus; and activate a normal mode when the state of charge is higher than the third threshold value, the normal mode being configured to permit operation of the propulsion structure and of the load-handling apparatus.

19. The work machine of claim 18, wherein, in the limited mode, operation restrictions on the load-handling apparatus include one or more of:

permitting the load-handling apparatus to move only in a direction of a folded position, limiting a maximum movement speed of the load-handling apparatus, limiting a maximum power available to the load-handling apparatus.

20. The work machine of claim 15, wherein the control unit is configured to:

compare the state of charge to a second threshold value that is higher than the first threshold value; and generate an alert signal when the state of charge is lower than or equal to the second threshold value.

* * * * *